US012664420B2

(12) United States Patent
Fukuda et al.

(10) Patent No.: US 12,664,420 B2
(45) Date of Patent: Jun. 23, 2026

(54) CROSS-LINGUAL KNOWLEDGE TRANSFER LEARNING

(71) Applicant: INTERNATIONAL BUSINESS MACHINES CORPORATION, Armonk, NY (US)

(72) Inventors: Takashi Fukuda, Tokyo (JP); Samuel Thomas, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1400 days.

(21) Appl. No.: 17/356,907

(22) Filed: Jun. 24, 2021

(65) Prior Publication Data
US 2022/0414448 A1 Dec. 29, 2022

(51) Int. Cl.
| | |
|---|---|
| *G06N 3/08* | (2023.01) |
| *G06F 7/76* | (2006.01) |
| *G06N 3/045* | (2023.01) |
| *G06N 20/20* | (2019.01) |

(52) U.S. Cl.
CPC ................ *G06N 3/08* (2013.01); *G06F 7/76* (2013.01); *G06N 3/045* (2023.01); *G06N 20/20* (2019.01)

(58) Field of Classification Search
CPC ........ G06N 3/0895; G06N 3/09; G06N 3/091; G06N 3/092; G06N 3/094; G06N 3/096; G06N 3/098; G06N 3/0985; G06N 3/0455; G06N 3/08; G06N 3/044; G06N 3/045; G06N 20/20; G06N 3/0442; G06F 7/76; G10L 15/183
See application file for complete search history.

(56) References Cited

U.S. PATENT DOCUMENTS

| | | | | |
|---|---|---|---|---|
| 10,796,686 | B2 * | 10/2020 | Arik | ...................... G10L 13/027 |
| 2018/0307679 | A1 | 10/2018 | Duong et al. | |
| 2021/0142164 | A1 * | 5/2021 | Liu | ...................... G06F 40/216 |

FOREIGN PATENT DOCUMENTS

WO 2020242567 A1 12/2020

OTHER PUBLICATIONS

Cho et al., "Pea-KD: Parameter-efficient and Accurate Knowledge Distillation on BERT," https://arxiv.org/abs/2009.14822 (Year: 2020).*

(Continued)

*Primary Examiner* — Van C Mang
*Assistant Examiner* — Nicholas Shine
(74) *Attorney, Agent, or Firm* — CHIP LAW GROUP

(57) ABSTRACT

Methods and systems for training a neural network include training language-specific teacher models using different respective source language datasets. A student model is trained, using the different respective source language datasets and soft labels generated by the language-specific teacher models, including shuffling the source language datasets and shuffling weights of language-dependent layers in language-specific parts of the student model. Weights of language-independent layers of the student model are copied to a language-independent layers of a target model to initialize language-independent layers of the target model. The target model is trained with a target language dataset.

16 Claims, 8 Drawing Sheets

(56)          References Cited

OTHER PUBLICATIONS

Chen et al., "Multitask learning of deep neural networks for low-resource speech recognition," IEEE/ACM Trans. Audio, Speech and Lang. Proc. 23, 7 (Jul. 2015), 1172-1183. https://doi.org/10.1109/TASLP.2015.2422573 (Year: 2015).*

Tan et al, "Multilingual Neural Machine Translation with Knowledge Distillation," https://arxiv.org/abs/1902.10461, (Year: 2019).*

Wang et al, "Structure-Level Knowledge Distillation For Multilingual Sequence Labeling," https://arxiv.org/abs/2004.03846, (Year: 2020).*

Qiu, X., et al. "Pre-trained models for natural language processing: A survey," in Science China Technological Sciences, vol. 63, No. 10, pp. 1872-1897, (Year: 2020).*

Mell et al., "The NIST Definition of Cloud Computing", National Institute of Standards and Technology, Special Publication 800-145. Sep. 2011, pp. 1-7.

Yi, Jiangyan, et al. "Language-Adversarial Transfer Learning for Low-Resource Speech Recognition", IEEE/ACM Transactions on Audio, Speech, and Language Processing. Dec. 24, 2018, pp. 621-630.

Huang, Jui-Ting, et al. "Cross-Language Knowledge Transfer Using Multilingual Deep Neural Network with Shared Hidden Layers", In2013 IEEE International Conference on Acoustics, Speech and Signal Processing, IEEE. May 26, 2013, pp. 1-5.

Bagchi, Deblin, et al. "Learning from the Best: A Teacher-Student Multilingual Framework for Low-Resource Languages", InICASSP 2019-2019 IEEE International Conference on Acoustics, Speech and Signal Processing, IEEE. May 12, 2019, pp. 6051-6055.

Chen, Xilun, et al. "Multi-Source Cross-Lingual Model Transfer: Learning What to Share", arXiv preprint arXiv:1810.03552. Jun. 5, 2019, pp. 1-15.

* cited by examiner

CROSS-LINGUAL KNOWLEDGE TRANSFER LEARNING

BACKGROUND

The present invention generally relates to natural language models, and, more particularly, to training natural language models with multilingual resources.

Training natural language models, such as for speech recognition, benefits from large amounts of training data. However, whereas some languages (e.g., English and Japanese) have large amounts of training data available for use, the majority of the world's languages and dialects do not have such extensive resources available.

SUMMARY

A method for training a neural network includes training language-specific teacher models using different respective source language datasets. A student model is trained, using the different respective source language datasets and soft labels generated by the language-specific teacher models, including shuffling the source language datasets and shuffling weights of language-dependent layers in language-specific parts of the student model. Weights of language-independent layers of the student model are copied to a language-independent layers of a target model to initialize language-independent layers of the target model. The target model is trained with a target language dataset.

A system for training a neural network includes a hardware processor and a memory that stores a computer program product. When executed by the hardware processor, the computer program product causes the hardware processor to train language-specific teacher models using different respective source language datasets, train a student model, using the different respective source language datasets and soft labels generated by the language-specific teacher models, including shuffling the source language datasets and shuffling weights of language-dependent layers in language-specific parts of the student model, copy weights of language-independent layers of the student model to a language-independent layers of a target model to initialize language-independent layers of the target model, and train the target model using a target language dataset.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Cross-lingual knowledge transfer learning may be performed for languages with few training resources available, making use of large amounts of multilingual resources to train a language independent part of the model that may be transferred to a language-specific model using a teacher/student learning framework.

During training of a language-independent part, a multilingual student model is trained with multiple languages, each of which may have large amounts of training data, using a set of single-language teacher models. The student model may include some layers which are language-dependent and some layers that are language-independent. Training of the multilingual student model may include shuffling of the language inputs and shuffling of trained language-dependent layer parameters to diminish the amount of language dependence within the language-independent layers.

The learned parameters of the language-independent layers within the student model may then be used to initialize a corresponding part of a language-specific target model. During training of the language-specific target model, only a target language is used to train the entire target model, including the initialized part.

In this way, parameters of a language-independent part may be trained with a large amount of source language data. When a target language with relatively few training resources is used, this cross-lingual transfer learning provides a significant improvement, and diminishes the need for target-language-specific data collection. For example, the language-independent part may be used to train the phoneme discrimination abilities of a speech recognition network, which may be relatively consistent across different languages.

Figure 1:
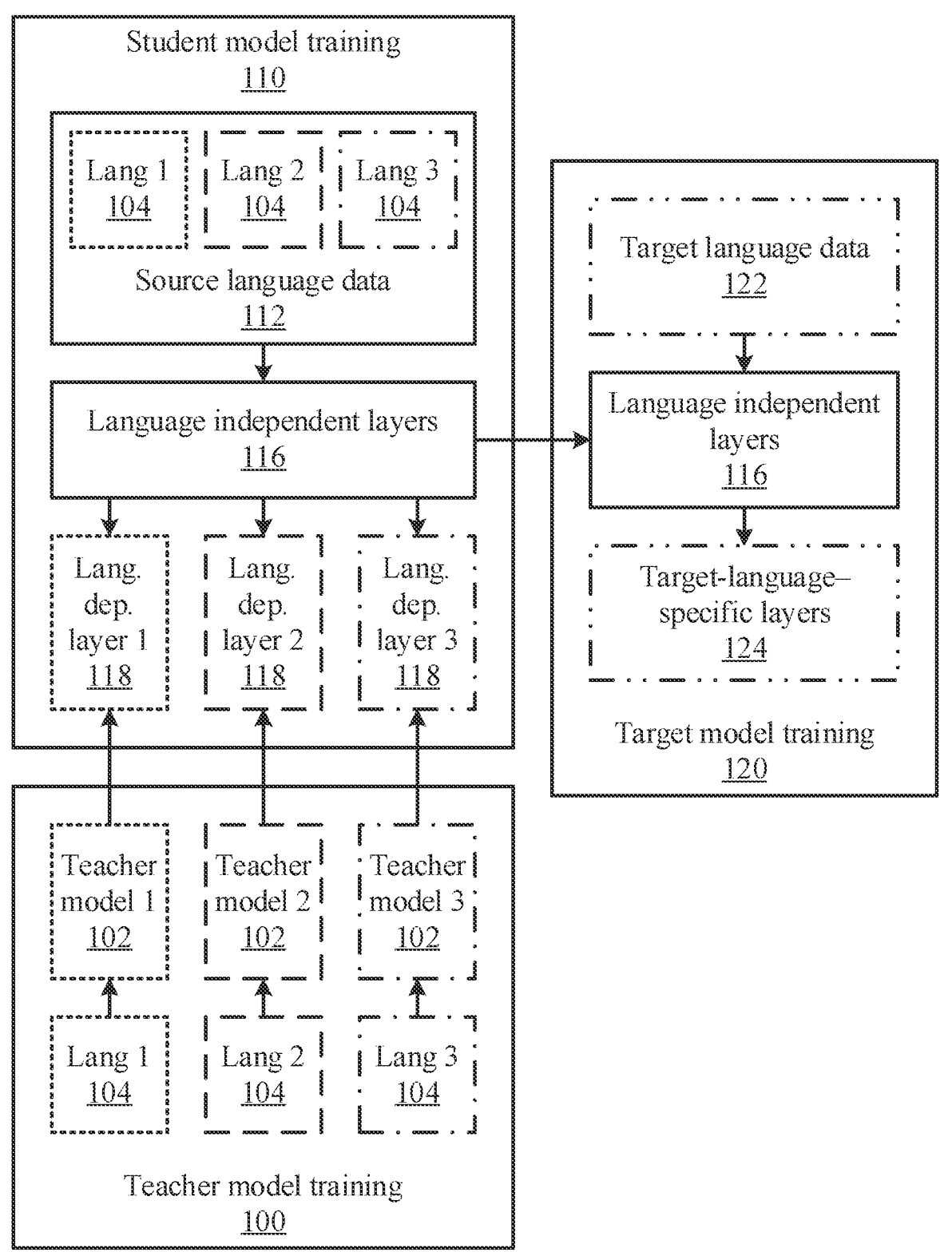
FIG. 1 is a block diagram of relationships between teacher models, a multi-language student model, and a target model for training the target model using language independent layers generated in the training of the multi-language student mode, in accordance with an embodiment of the present invention.

Referring now to FIG. 1, an exemplary relationship between training teacher models 100, training a student model 110, and training a target model 120 is shown. Language-specific teacher models 102 are trained using respective language datasets 104, which may include multiple different respective languages. It is specifically contemplated that these languages may include languages that have a large amount of available training data, such as English, Japanese, and German, but any appropriate languages may be used. For ease of visually distinguishing between the language-dependent components, each of Languages 1, 2, 3, and the Target are shown with distinct line dashing. The source language data 104 may include, for example, speech data that is labeled according to particular phonemes. The source language data 104 may also include multilingual training datasets, for example including speech from multiple different languages in a single combined dataset.

The teacher models 102 may include an artificial neural network (ANN) that has multiple distinct sections. For example, the teacher models 102 may each be made up of a series of bidirectional long short-term memory (BLSTM) layers, with a softmax output layer. Each of the teacher models 102 may be separately trained with its respective language data 104. In some examples, the teacher models 102 may be trained to generate phones, senones, or tied quinphone states from speech data inputs.

The outputs of the teacher models 102 may be used to train a student model in block 110, which may also be implemented as an ANN. The student model may include a set of language-independent layers 116 and language-dependent layers 118, where the language-dependent layers 118 may correspond to the respective different language data sets 104. In one example, the language-independent layers 116 and the language dependent layers 118 may be made up of respective series of fully connected layers. During training, the source language data 104 is used to train the model, including both the language independent layers 116 and the language dependent layers 118 in conjunction. The outputs of the teacher models 102 may be used to provide a baseline for the training, with differences of the generated output of the student model from the expected outputs of the teacher models 102 being used to generate an error signal that provides updates to the weights of the student model.

Training may include shuffling of the language input data, as will be described in greater detail below. Such shuffling may include, for example, cross-training the language-dependent layers 118 with language training datasets 104 other than their native language. Thus, for a first language-dependent layer 118 that is first trained using a Japanese language dataset, shuffling may then train the first language-dependent layer 118 with a different language dataset 106, such as English. Shuffling may furthermore include copying weights among the language-dependent layers 118.

Once student model training 110 is complete, target model training 120 may be performed, using language data specific to the target language. Any language dataset may be used for the target language data 122, and it is specifically contemplated that the target language data 122 may be less extensive than the language datasets 104 used for teacher model training 100 and student model training 110. As with the student model, the target model may include language independent layers 116 and target-language-specific layers 124, each of which may be made up of a respective series of fully connected layers.

Target model training 120 imports the weight parameters of the language independent layers 116 that were generated during the student model training 110. These weight parameters are used to initialize the language independent layers 116 of the target model before training on the target language data 122. Training then updates both the language-independent layers 116 and target-language-specific layers 124 to train the target model on the target language.

Figure 2:
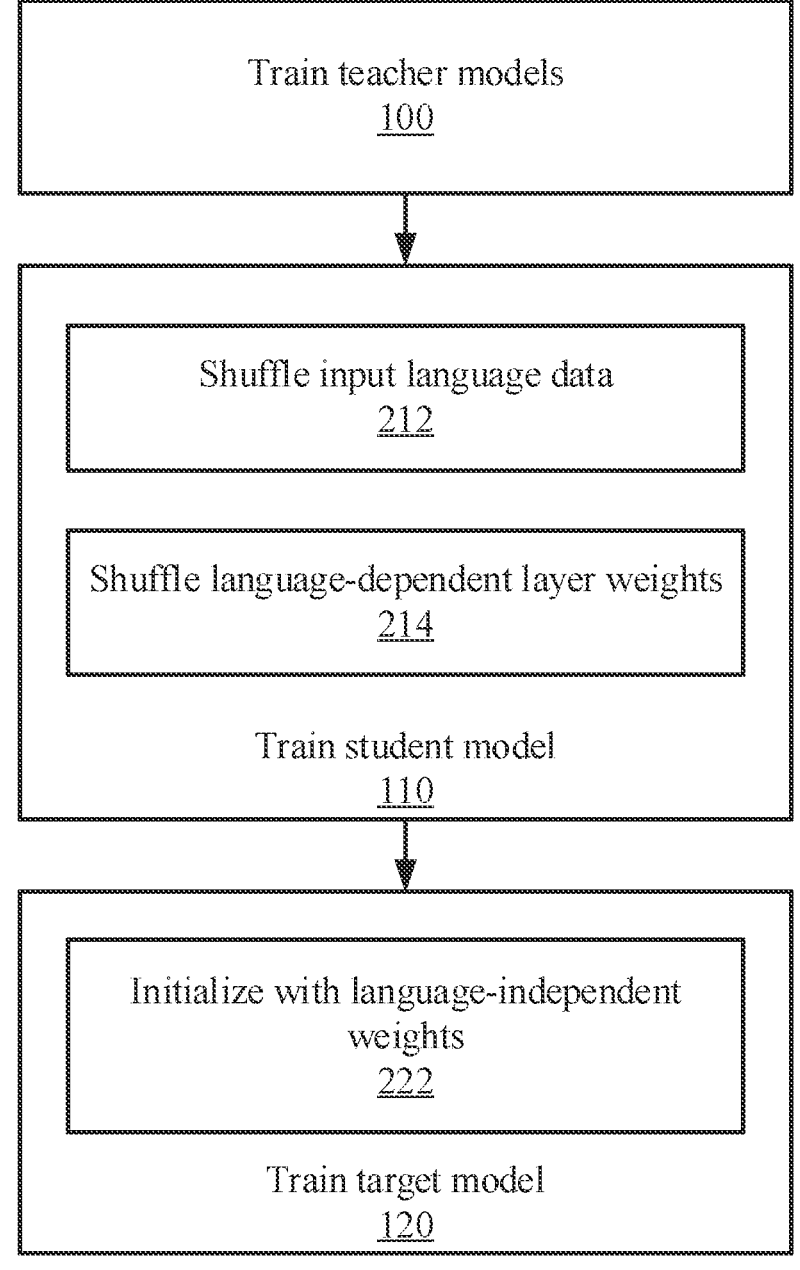
FIG. 2 is a block/flow diagram showing a method of training a target model using language-independent layers generated in the training of a multi-language student model, in accordance with an embodiment of the present invention.

Referring now to FIG. 2, another view on the training process is shown. After the teacher models have been trained 100, during training of the student model 110, shuffling of the input language data 212 may be performed. The language 104 that a particular teacher network 102 is primarily trained on is referred to herein as its L1 language, while other languages 104 are referred to as L2 languages of that network. Thus, as shown in FIG. 1, the first teacher model 102 has an associated first language data set 104 that is its L1 language, while the second and third language datasets 104 are its L2 languages.

Figure 3:
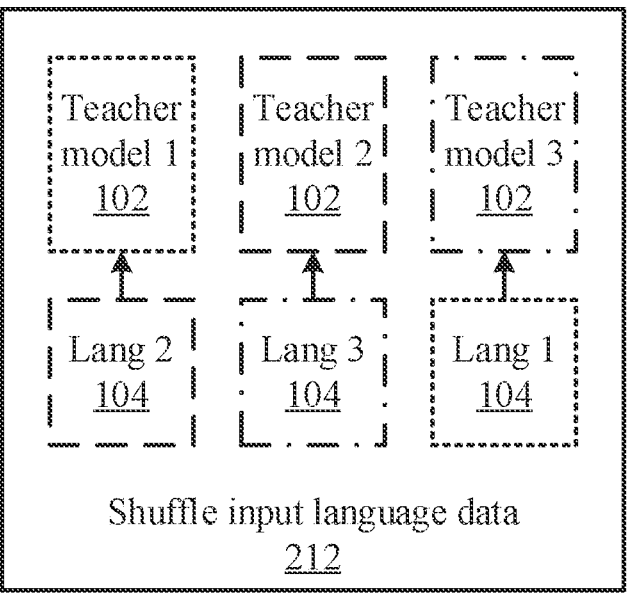
FIG. 3 is a diagram illustrating the shuffling of input language data during the training of a multi-language student model, in accordance with an embodiment of the present invention.

While teacher models may be used to generate soft labels corresponding to their L1 languages, they can also process and produce soft labels for L2 languages, in terms of their L1 language output set. When shuffling the input language data 202, the input data 104 that is processed by the teacher networks 102 is reordered to produce cross-lingual labels. This shuffling is illustrated in FIG. 3. For example, using the second language data 104 as an input to the first teacher model 102, cross-lingual soft labels are output and may be used to update the respective branch of the language-dependent layers 118 of the student model. To do this, the input L2 language data is also provided as an input to the student model in block 212. This form of cross-lingual training works within the present framework, even though the phonetic space of one language may not fully overlap with the phonetic space of another language. In some cases, a portion of the input language data (e.g., 10%-20%) may be shuffled. Thus, for example, if the source languages each have 100 hours of training data available, 20 hours of training data may be swapped between respective languages, with the remainder being left intact.

Figure 4:
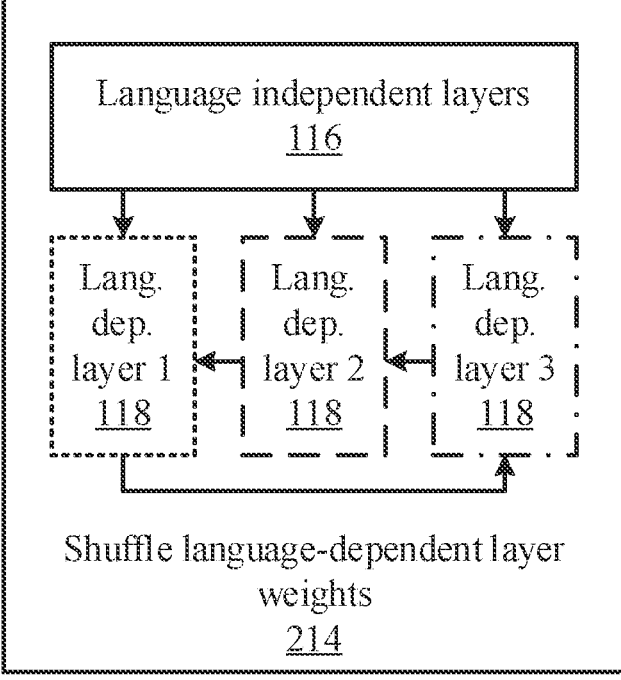
FIG. 4 is a diagram illustrating the shuffling of weights between language-dependent layers in a multi-language student model, in accordance with an embodiment of the present invention.

In a second shuffling mechanism, the weights of the language-dependent layers 118 may be shuffled 214. Instead of reordering data, the language-dependent layers 118 in the student model are replaced by copying weights across languages, as shown in FIG. 4. These language-dependent layers learn language specifics during training. By reordering them, cross-lingual knowledge from other languages is injected into various language-specific parts of the network. These operations may make the student model more robust to changing language data inputs and may alleviate language dependencies of the student model. This shuffling may also be represented as localized self-transfer learning, as sub-parts of the network are initialized with other parts of the same network.

In some cases, the shuffling of language-dependent layer weights 214 may be performed after the shuffling of input language data 212, while on other cases the shuffling of input language data 212 may be performed after the shuffling of language-dependent layer weights 214. In some cases, each shuffling step may be repeated more than once, with one or more rounds of training being performed between shuffles.

During training of the target model 120, the language-independent layers 116 of the target model may be initialized 222 using the values learned during training of the student model 116. The shared layers may be expected to exhibit language invariance, while being able to discriminate between various speech sounds. The resulting target model, including language-independent initialization, may provide superior results to one that is trained from scratch, for example using zero-initialized or randomly initialized values for these layers.

Knowledge distillation may thus be used to enhance phoneme classification abilities for each language in the student model. In such a framework, instead of training models in a single step, training may be split into two steps, including training a complex teacher neural network, followed by training a relatively simple student network using soft outputs generated by the teacher model. In the first step, a relatively complex model based on BLSTM layers, convolutional neural networks (CNNs), and/or residual neural networks is initially trained using hard targets. The student network is then trained using the soft outputs of the teachers, using a training criterion that minimizes the differences between the student and teacher distributions as, e.g.:

$$\mathcal{L} = -\sum_i q_i(x)\log p_i(x)$$

where i is an index of context-dependent phones, $q_i(x)$ is a soft label from the teacher network for an input feature $x\in\hat{\chi}$, which also works as a pseudo-label, and $p_i(x)$ is an output probability of the class from the student network. With soft labels $q_i(x)$, competing classes may have small, but non-zero, posterior probabilities for each training example. Thus, training the student model 110 seeks to minimize this loss function $\mathcal{L}$ by adjusting the parameters of the language-independent layers 116 and the language-dependent layers 118.

Figure 5:
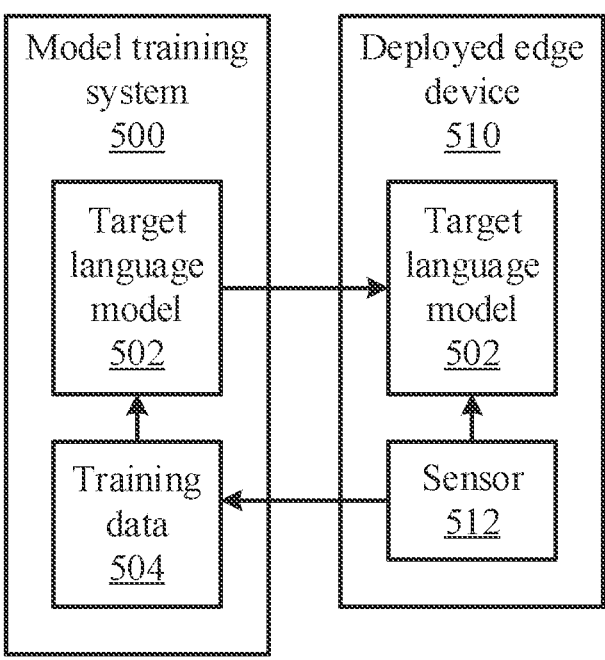
FIG. 5 is a block diagram showing a relationship between a model training system and a deployed edge device, in accordance with an embodiment of the present invention.

Referring now to FIG. 5, an exemplary system for training and using a language model is shown. A model training system 500 performs training for a target language model 502, for example as described above, using a set of training data 504. The trained target language model 502 may then be transmitted to a deployed edge device 510. In this example, the model training system 500 and the deployed edge device 510 are shown as being distinct computer systems, though it should be understood that the model training system 500 may also be integrated with the deployed edge device 510.

The trained target language model 502 may be transmitted from the model training system 500 to the deployed edge device 510 by any appropriate communications medium. For example, the target language model 502 may be transmitted by any appropriate wired or wireless communications medium and protocol. In some cases, the target language model 502 may be part of a software package that is installed at the deployed edge device 510.

After receiving the target language model 502, the deployed edge device may use a sensor 512 to perform a language processing function. For example, such a sensor 512 may include a microphone or other device that is capable of recording speech information. The recorded speech information may then be used as an input to the target language model 502, for example to perform speech recognition or any other appropriate task. In some cases, information that is recorded by the sensor 512 may be transmitted back to the model training system 500. Such returned information may be annotated and used to update the training of the target language model 502.

The model training system 500 may be implemented, for example, in a cloud computing system. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Figure 6:
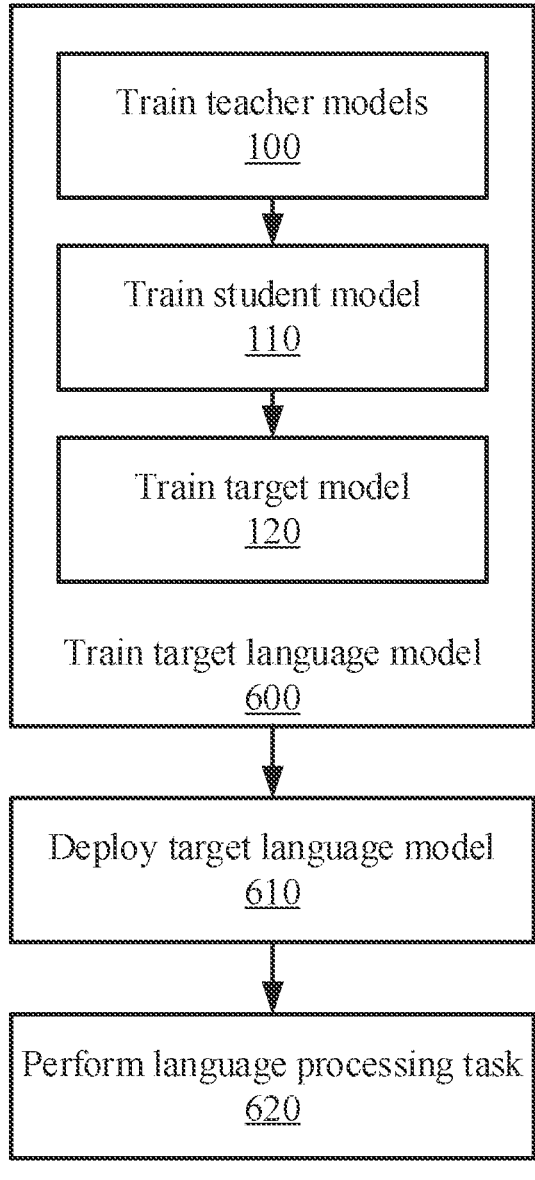
FIG. 6 is a block/flow diagram of a method for training, deploying, and using a language model, in accordance with an embodiment of the present invention.

Referring now to FIG. 6, a method of training, deploying, and using a language model is shown. Block 600 trains the target language model 502, as described above. Block 610 then deploys the trained target language model 502 to the deployed edge device 510. Block 620 performs the language processing task, using the trained target language model 502 and data from the sensor 512.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

As noted above, the teacher models, student model, and target language model may be implemented as ANNs. An ANN is an information processing system that is inspired by biological nervous systems, such as the brain. One element of ANNs is the structure of the information processing system, which includes a large number of highly interconnected processing elements (called "neurons") working in parallel to solve specific problems. ANNs are furthermore trained using a set of training data, with learning that involves adjustments to weights that exist between the neurons. An ANN is configured for a specific application, such as pattern recognition or data classification, through such a learning process.

Figure 7:
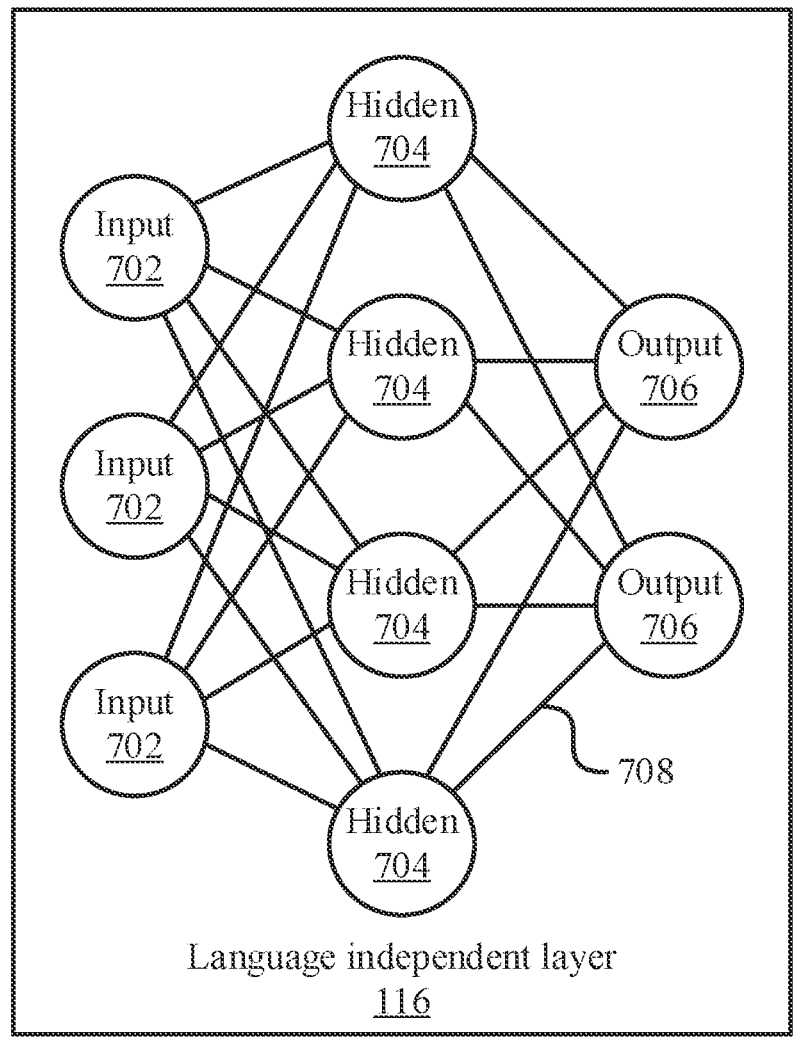
FIG. 7 is a diagram of an exemplary neural network layer, in accordance with an embodiment of the present invention.

Referring now to FIG. 7, a generalized diagram of a neural network is shown. Although a specific structure of an ANN is shown, having three layers and a set number of fully connected neurons, it should be understood that this is intended solely for the purpose of illustration. In practice, the present embodiments may take any appropriate form, including any number of layers and any pattern or patterns of connections therebetween. In this case, a language independent layer 116 is illustrated as a fully connected layer.

ANNs demonstrate an ability to derive meaning from complicated or imprecise data and can be used to extract patterns and detect trends that are too complex to be detected by humans or other computer-based systems. The structure of a neural network is known generally to have input neurons 702 that provide information to one or more "hidden" neurons 704. Connections 708 between the input neurons 702 and hidden neurons 704 are weighted, and these weighted inputs are then processed by the hidden neurons 704 according to some function in the hidden neurons 704. There can be any number of layers of hidden neurons 704, and as well as neurons that perform different functions. There exist different neural network structures as well, such as a convolutional neural network, a maxout network, etc., which may vary according to the structure and function of the hidden layers, as well as the pattern of weights between the layers. The individual layers may perform particular functions, and may include convolutional layers, pooling layers, fully connected layers, softmax layers, or any other appropriate type of neural network layer. Finally, a set of output neurons 706 accepts and processes weighted input from the last set of hidden neurons 704.

This represents a "feed-forward" computation, where information propagates from input neurons 702 to the output neurons 706. Upon completion of a feed-forward computation, the output is compared to a desired output available from training data. The error relative to the training data is then processed in "backpropagation" computation, where the hidden neurons 704 and input neurons 702 receive information regarding the error propagating backward from the output neurons 706. Once the backward error propagation has been completed, weight updates are performed, with the weighted connections 708 being updated to account for the received error. It should be noted that the three modes of operation, feed forward, back propagation, and weight update, do not overlap with one another. This represents just one variety of ANN computation, and that any appropriate form of computation may be used instead.

To train an ANN, training data can be divided into a training set and a testing set. The training data includes pairs of an input and a known output. During training, the inputs of the training set are fed into the ANN using feed-forward propagation. After each input, the output of the ANN is compared to the respective known output. Discrepancies between the output of the ANN and the known output that is associated with that particular input are used to generate an error value, which may be backpropagated through the ANN, after which the weight values of the ANN may be updated. This process continues until the pairs in the training set are exhausted.

After the training has been completed, the ANN may be tested against the testing set, to ensure that the training has not resulted in overfitting. If the ANN can generalize to new inputs, beyond those which it was already trained on, then it is ready for use. If the ANN does not accurately reproduce the known outputs of the testing set, then additional training data may be needed, or hyperparameters of the ANN may need to be adjusted.

ANNs may be implemented in software, hardware, or a combination of the two. For example, each weight 708 may be characterized as a weight value that is stored in a computer memory, and the activation function of each neuron may be implemented by a computer processor. The weight value may store any appropriate data value, such as a real number, a binary value, or a value selected from a fixed number of possibilities, that is multiplied against the relevant neuron outputs. Alternatively, the weights 708 may be implemented as resistive processing units (RPUs), generating a predictable current output when an input voltage is applied in accordance with a settable resistance.

A fully connected layer is a type of ANN layer where each neuron has a weight connecting it to each neuron of another layer (e.g., the preceding layer and/or the following layer). This is just one type of ANN layer, and other varieties are contemplated herein. For example, it is specifically contemplated that the teacher model may be implemented using BLSTM layers. LSTM networks are a variety of recurrent neural network (RNN) that store information within the LSTM neurons for future use. Use of the memory may be controlled by the neuron's activation function. The use of this memory helps preserve gradient information during backpropagation.

The outputs of the respective models may use, e.g., softmax functions to normalize the output of the respective models to a probability distribution with a number of features. For example, each component output by the softmax function may be a number between zero and one, with the sum of the components equaling one.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
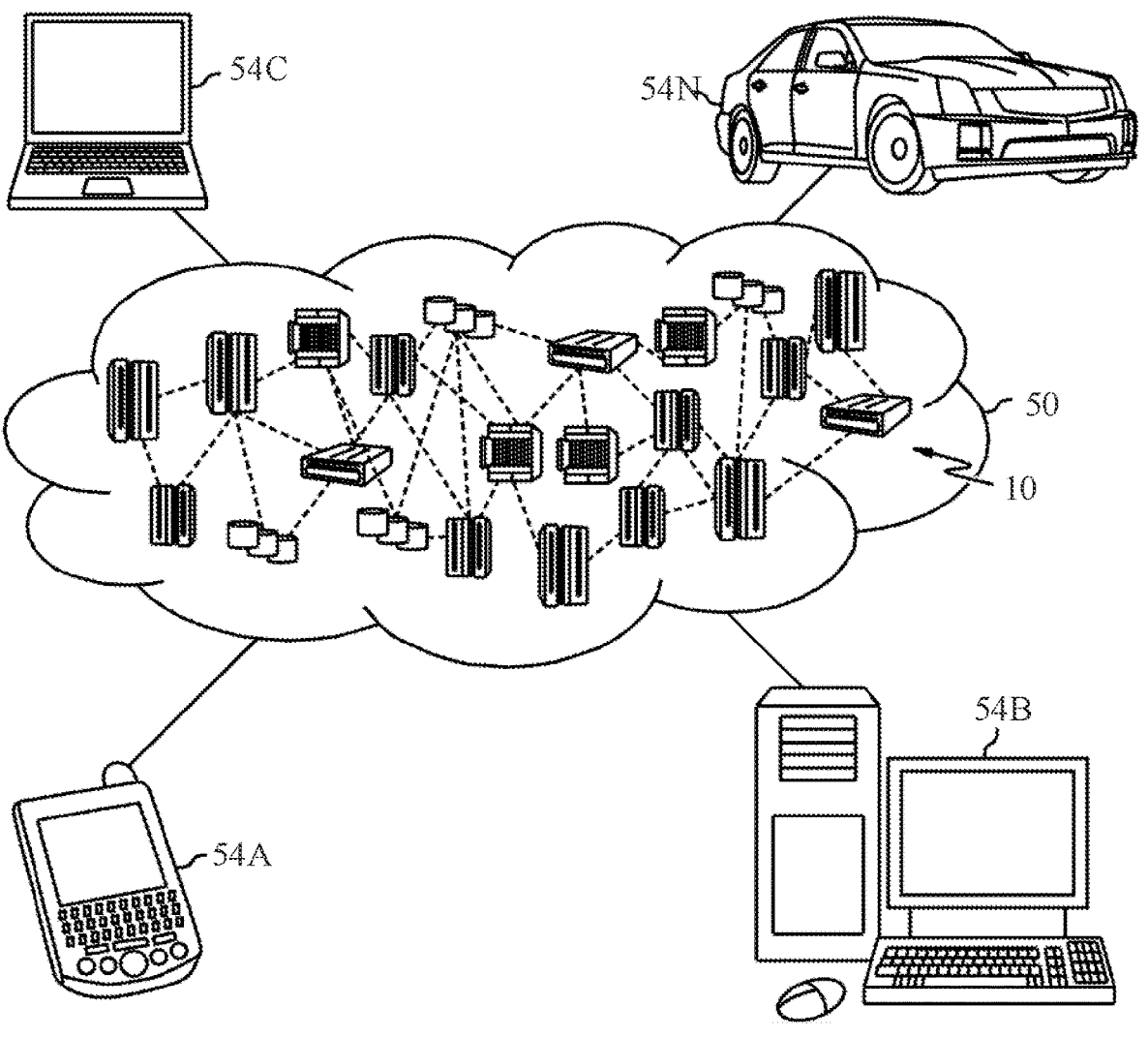
FIG. 8 is a block diagram showing an illustrative cloud computing environment having one or more cloud computing nodes with which local computing devices used by cloud consumers communicate in accordance with one embodiment.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
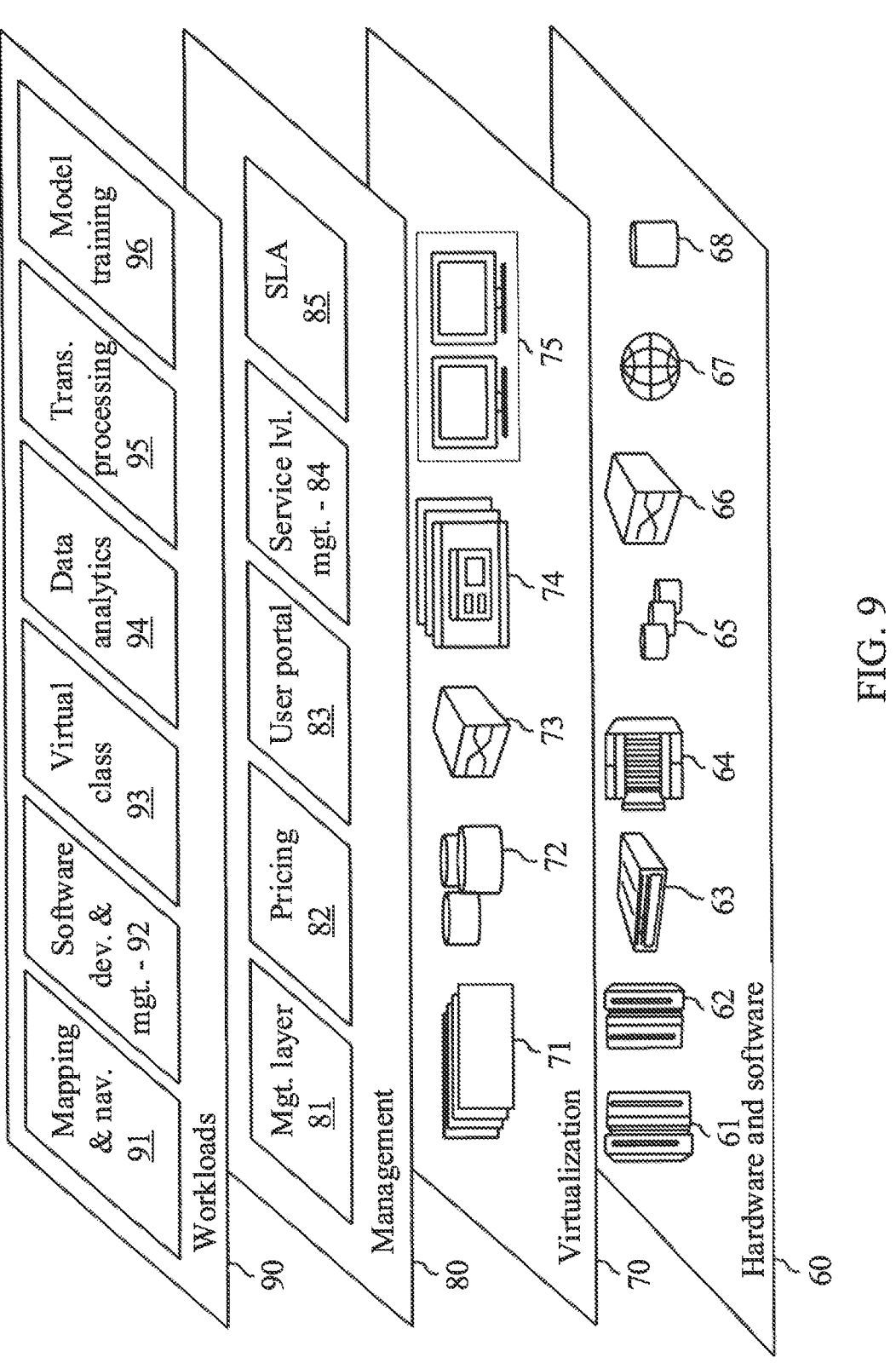
FIG. 9 is a block diagram showing a set of functional abstraction layers provided by a cloud computing environment in accordance with one embodiment.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and training a language model 96.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer program product for training a neural network, the computer program product comprising a computer readable storage medium having program instructions embodied therewith, the program instructions executable by a hardware processor to cause the hardware processor to:

train language-specific teacher models using different respective source language datasets;

train a student model, using the different respective source language datasets and soft labels generated by the language-specific teacher models, including shuffling the source language datasets and shuffling weights of language-dependent layers in language-specific parts of the student model;

wherein the student model includes a plurality of the language-specific parts, each associated with a different language-specific teacher model, and wherein each of the different respective source language datasets includes a different source language;

wherein the computer program product further causes the hardware processor to shuffle the source language datasets by using inputs to the language-specific teacher models in a language other than a language for which the language-specific teacher models were trained;

copy weights of language-independent layers of the student model to a language-independent layers of a target model to initialize language-independent layers of the target model; and train the target model using a target language dataset.

2. The computer program product of claim 1, wherein the computer program product further causes the hardware processor to shuffle the weights of the language-dependent layers by copying parameters of trained language-dependent layers of a first language-specific part to language-dependent layers of a second language-specific part.

3. The computer program product of claim 1, wherein the target language dataset is for a language other than languages represented in the source language datasets and has an amount of training data that is less than the training data available in each of the source language datasets.

4. The computer program product of claim 1, wherein each language-specific teacher model includes a bidirectional long-short term memory layer.

5. The computer program product of claim 1, wherein each language-independent layer is a fully connected layer.

6. The computer program product of claim 1, wherein the computer program product further causes the hardware processor to perform multiple training iterations of the student model, with shuffling the source language datasets and shuffling the weights each being performed after different iterations.

7. The computer program product of claim 6, wherein computer program product further causes the hardware processor to perform each of shuffling the source language datasets and shuffling the weights multiple times during training the student model.

8. The computer program product of claim 1, wherein the computer program product further causes the hardware processor to train the target model by updating the initialized language-independent layers of the target model and a language-dependent part of the target model.

9. A method for training a neural network, comprising:

training language-specific teacher models using different respective source language datasets;

training a student model, using the different respective source language datasets and soft labels generated by the language-specific teacher models, including shuffling the source language datasets and shuffling weights of language-dependent layers in language-specific parts of the student model;

wherein the student model includes a plurality of the language-specific parts, each associated with a different language-specific teacher model, and wherein each of the different respective source language datasets includes a different source language;

wherein shuffling the source language datasets includes using inputs to the language-specific teacher models in a language other than a language for which the language-specific teacher models were trained;

copying weights of language-independent layers of the student model to a language-independent layers of a target model to initialize language-independent layers of the target model; and training the target model with a target language dataset, using a hardware processor.

10. A system for training a neural network, comprising:

a hardware processor; and a memory that stores a computer program product, which, when executed by the hardware processor, causes the hardware processor to:

train language-specific teacher models using different respective source language datasets;

train a student model, using the different respective source language datasets and soft labels generated by the language-specific teacher models, including shuffling the source language datasets and shuffling weights of language-dependent layers in language-specific parts of the student model;

wherein the student model includes a plurality of the language-specific parts, each associated with a different language-specific teacher model, and wherein each of the different respective source language datasets includes a different source language;

wherein the computer program product further causes the hardware processor to shuffle the source language datasets by using inputs to the language-specific teacher models in a language other than a language for which the language-specific teacher models were trained;

copy weights of language-independent layers of the student model to a language-independent layers of a target model to initialize language-independent layers of the target model; and train the target model using a target language dataset.

11. The computer program product of claim 10, wherein the computer program product further causes the hardware processor to shuffle the weights of the language-dependent layers by copying parameters of trained language-dependent layers of a first language-specific part to language-dependent layers of a second language-specific part.

12. The computer program product of claim 10, wherein the target language dataset is for a language other than languages represented in the source language datasets and has an amount of training data that is less than the training data available in each of the source language datasets.

13. The computer program product of claim 10, wherein each language-specific teacher model includes a bidirectional long-short term memory layer.

14. The computer program product of claim 10 wherein each language-independent layer is a fully connected layer.

15. The computer program product of claim 10, wherein the computer program product further causes the hardware processor to perform multiple training iterations of the student model, with shuffling the source language datasets and shuffling the weights each being performed after different iterations.

16. The computer program product of claim 15, wherein computer program product further causes the hardware processor to perform each of shuffling the source language datasets and shuffling the weights multiple times during training the student model.

* * * * *